United States Patent Office 3,436,989
Patented Apr. 8, 1969

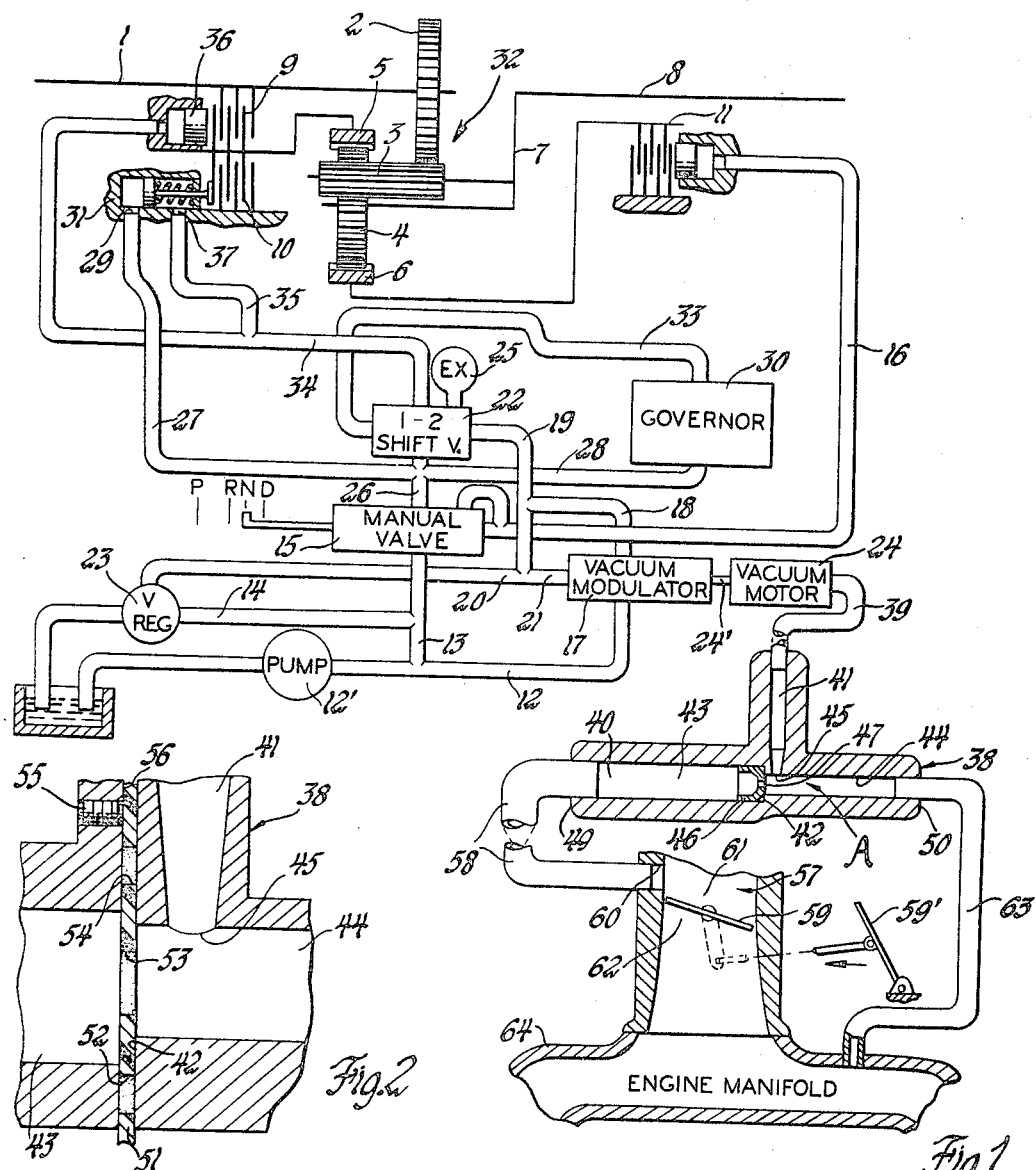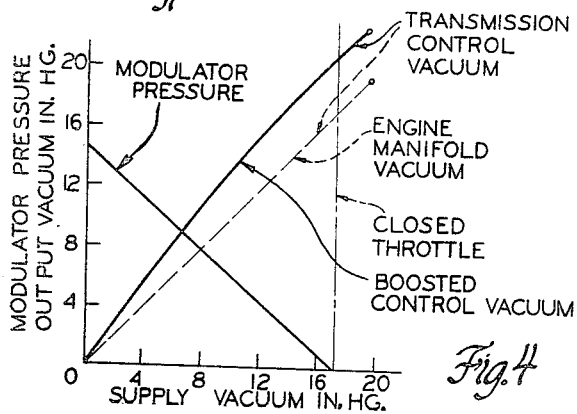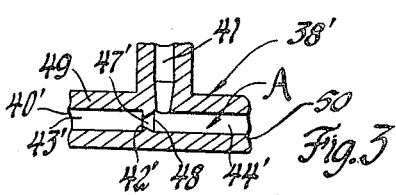

3,436,989
ENGINE DRIVEN TRANSMISSION AND
CONTROLS
Thomas J. Kreig, East Lansing, and Gerald E. Kapp, Lansing, Mich., assignors to General Motors Corporation, Detroit, Mich., a corporation of Delaware
Filed Feb. 10, 1967, Ser. No. 615,223
Int. Cl. F16h 47/00
U.S. Cl. 74—864
15 Claims

ABSTRACT OF THE DISCLOSURE

An engine driven multiratio transmission is disclosed with a shift control system having a main line pressure for establishing the ratios and a modulated pressure providing a downshift bias on the speed upshifted shift valve in which both pressures vary with the normal engine manifold vacuum during open throttle engine operation and a boosted engine manifold vacuum during closed throttle engine operation to soften closed throttle downshifts.

---

This invention relates to engine driven automatic multiratio transmissions and their controls and particularly vacuum responsive controls.

Automatic ratio changing transmissions have a hydraulic control to control the engagement of ratio establishing devices such as clutches and brakes. The force available to engage a clutch or brake is a function of the main line pressure and the force needed is a function of the torque to be transmitted and a function of the torque demand or throttle position. If the force available for engagement is higher than the force needed for engagement, the ratio change is harsh or perceptible to the passengers. A harsh ratio change condition can be corrected by decreasing the force available for engagement by decreasing the main line pressure.

In automatic transmissions, a modulator valve provides a modulator pressure proportional to the torque demand which is used to provide the downshift force on the shift valves and to regulate the main line pressure used to engage the ratio establishing devices. During a closed throttle condition, the engine vacuum is maximum while modulator pressure and main line pressure are minimum and as the throttle opens, vacuum is decreased and modulator and main line pressure are increased. Heretofore, if a low engine vacuum condition existed, thereby causing a harsh downshift to occur, due to excessive engagement force, a change in the vacuum modulator valve assembly or a change in the vacuum determining factors of the engine, such as the camshaft and idle speed, would be required to correct this condition. With the present invention, however, it is possible to correct a harsh downshift by using a vacuum booster, which may be located adjacent the manifold and actuated by a control on closing of the carburetor throttle valve, thereby changing the value of the output vacuum signal relative to the vacuum source.

The vacuum booster has an intersecting passage just downstream of a restriction in a through passage. A flow of air through the restriction creates a reduced pressure region downstream of the restriction so the intersecting passage is subjected to the reduced pressure. This passage is connected to the vacuum motor of the transmission control. The through passage is connected to a vacuum source, such as a carburetor throat or inlet manifold on the downstream end and is selectively open to atmosphere or to vacuum at the upstream end by the throttle control. Preferably the restriction is adjustable so the vacuum signal can be raised or lowered by changing the restriction size.

An object of this invention is to provide an engine driven transmission and control system having a control signal generated by a transmission control vacuum having a degree different than the degree of engine inlet vacuum.

Another object of this invention is to provide an engine driven transmission and control system having a control signal generated by a transmission control vacuum having a degree adjustable with respect to the degree of engine inlet vacuum.

Another object of this invention is to provide an engine driven transmission and control system having a control signal generated by a transmission control vacuum derived from engine inlet vacuum modified by another transmission control function.

Another object of this invention is to provide an engine driven transmission and control system having a ratio change control signal generated by a transmission control vacuum having a higher degree of vacuum than engine inlet vacuum at low throttle opening.

The nature of this invention and other objects and advantages will be apparent from the following specification and the annexed drawings in which:

FIGURE 1 is a diagrammatic view of an automatic transmission control with a vacuum booster installed.

FIGURE 2 is an enlarged view of a portion of the vacuum booster seen in FIGURE 1 showing a modification.

FIGURE 3 is a sectional elevation view of another embodiment.

FIGURE 4 shows curves describing the output vacuum signal and modulator pressure relative to the vacuum source.

The invention may be used in the engine driven transmission having a control circuit shown in FIGURE 1. The conventional transmission drive train has an engine driven input member 1 driving input sungear 2 which meshes with the long planetary pinion 3 which meshes with the short pinion 4. The short pinion meshes with the control sungear 5 and reverse ring gear 6. The long and short pinions are mounted on carrier 7 which drives output member 8. High clutch 9, connecting input member 1 and control sungear 5 is engaged for 1 to 1 or high ratio drive. Low brake 10 is engaged to hold control sungear 5 for a reduction or low drive. Reverse brake 11 is engaged to hold ring gear 6 for reverse drive. The pump 12′ supplies fluid to line 12 and branch lines 13 and 14 which is regulated at main line pressure by regulator valve 23. When the manual valve 15 is placed in the neutral position N, the fluid does not pass through the manual valve 15.

The fluid under main line pressure in line 12 is directed to the vacuum modulator valve 17, a regulator valve, which supplies the modulator pressure fluid which varies with engine vacuum to line 18 and branch lines 19, 20, and 21. Line 19 directs modulator pressure fluid to a 1-2 shift valve 22 while lines 20 and 21 supply control signals to the pressure regulator valve 23 and the vacuum modulator valve 17. The modulator pressure in line 18, is determined by a biasing or spring force as reduced by the force produced by a vacuum motor 24, acting through rod 24′ on one end of a valve spool, and the modulator pressure in line 21 acting on the other end of the valve spool of the vacuum modulator valve 17 which is a regulator valve like modulator valve 130, FIGURE 2 of United States Patent Number 3,003,368, Winchell. This patent also illustrates suitable example of conventional shift, manual and line regulator valves.

The modulator pressure is a maximum determined by the spring force at zero vacuum and is reduced with increasing vacuum and has a zero value when the vacuum force overcomes this spring force as shown by the illustrative modulator pressure curve in FIGURE 4. The modulated pressure varies with or is a function of torque demand. Modulator pressure values may also have governor pressure acting on an unbalanced area, as shown by the above Winchell patent, so modulator pressure also decreases as a function of increasing output speed but this invention does not change this speed control.

The pressure regulator valve 23 functions to limit the maximum main line pressure. The modulator pressure in line 20, acting on the pressure regulator valve 23, causes the main line pressure to increase or decrease as the modulator pressure in line 20 increases or decreases.

The manual valve 15 in reverse position R supplies main line pressure to line 16 to engage motor operated reverse brake 11 for reverse drive and in other positions exhausts line 16 to disengage reverse drive. When the manual shift valve 15 is placed in the forward drive position D, the fluid in line 13 is communicated through the valve 15 to lines 26, 27, and 28. Line 26 directs fluid to the 1-2 shift valve 22 while lines 27 and 28 direct fluid to a low servo apply port 29 and a governor 30, respectively. The fluid pressure in line 27 causes the low servo 31 to be energized and thereby establishing a low speed forward gear ratio in a planetary gear set 32. The conventional shift valve 22 is held in a low position by the modulator pressure in line 19 and preferably a spring, so that the fluid in line 26 does not pass through the shift valve 22 to high clutch line 34 and line 34 is connected to exhaust 25.

The governor 30, driven by output member 8, may be any conventional governor which when supplied with fluid by line 28 and the vehicle begins to move supplies to line 33, a governor pressure, which increases as vehicle speed increases and, therefore, produces a governor signal proportional to vehicle speed. The governor pressure in line 33 is directed to the shift valve 22 to tend to upshift the shift valve against the forces of the spring, and the modulator pressure. When the governor pressure in line 33 reaches a level sufficient to overcome the spring force and the modulator pressure in line 19, the shift valve 22 will open and allow the fluid under pressure in line 26 to flow through the valve to lines 34 and 35. Line 34 directs fluid to a forward clutch 36 and line 35 directs fluid to a servo release port 37 of the low servo 31. This causes the high clutch 9 to engage and the low servo 10 to deenergize thereby establishing a high gear forward speed ratio in the planetary gear set 32.

As mentioned previously, the modulator pressure in line 19 is a function of the transmission control vacuum signal supplied by a vacuum booster 38 and a conduit 39 to the vacuum motor 24. The vacuum booster 38 has a through passage 40 connected at the left end 49 by a line 58 to a carburetor 57 providing valve means for throttle controlled selective connection to atmosphere and to vacuum source and connected at the right end 50 by a line 63 to a vacuum source such as engine manifold 64 and a passage 41 perpendicular to and intersecting the through passage 40. The through passage 40 has an abutment surface 42, a large diameter portion 43 and a small diameter portion 44. The point of intersection 45 between the through passage 40 and the passage 41 is in the small diameter portion 44 close to the abutment surface 42. A restricting member 46 is pressed in the large diameter portion 43 and abuts the abutment surface 42. The member 46 has a restricted passage 47 which is smaller in diameter than the small diameter portion 44 and causes a reduced pressure region, downstream of the restriction generally designated A, when fluid flows from the large diameter portion 43 to the smaller diameter portion 44. This reduced pressure region occurs at the intersection point 45 thereby subjecting the passage 41, the conduit 39 and the vacuum motor 24 to the reduced pressure. Since the components, such as springs and valve spool areas, in the transmission control will vary and the transmission may be used with different engines and vehicles, it is necessary to have a variety of restricted passage sizes to accommodate these variables. The restriction member 46 is removable to facilitate a change in the size of the restricted passage 47. Thus, in effect, an adjustable orifice is provided.

The curve in FIGURE 4 shows the relationship between the engine manifold or supply vacuum in the small diameter portion 44 of through passage 40 and the boosted transmsision control or output vacuum in passage 41, conduit 39, and vacuum motor 24. As may be seen from the curves, the boosted vacuum increases more rapidly than the engine vacuum for the normal operating range of the engine vacuum. If the size of the restricted passage 47 is changed, the relationship between boosted vacuum and engine vacuum will change.

The carburetor 57 of the engine driving the transmission has a throttle valve 59 which is manually opened and closed by the throttle control linkage to increase (indicated by arrow) and decrease engine speed. A passage 60 larger than restriction 47 communicates atmospheric pressure on the upper side 61 of the throttle valve 59 to the line 58 when the throttle valve 57 is closed as shown, and engine manifold vacuum on the lower side 62 of the throttle valve 59 when the throttle valve 59 is opened. Thus when the throttle valve 59 is closed, atmospheric pressure air in upper side 61 of the carburetor throat flows via passage 60, line 58, through restriction 47 in passage 40 and line 63 to the engine manifold and reduced pressure in region A provides boosted transmission control vacuum in passage 41. However, when the throttle valve 59 is opened, the vacuum booster will be inoperative because the pressure in passage 40 will be constant or the same at both ends and no fluid flow will take place. Therefore, the vacuum booster 38 will be operative at closed throttle and inoperative at open throttle. Thus the transmission control vacuum in line 39 will be the same as the supply or manifold vacuum from zero supply vacuum to closed throttle position indicated by the vertical dot dash line and then will change to boosted control vacuum.

When the vehicle is brought to a stop, the transmission will automatically shift from the high gear ratio to the low gear ratio during the deceleration period. This is known as a closed throttle downshift. Closed throttle indicates the position of the throttle valve 59 when the engine is being operated at the idle condition. That is the throttle valve is sufficiently closed to permit only a small amount of air flow past the throttle valve 59 to the engine power cylinders, thereby creating an air-fuel mixture which contains only enough energy to allow the engine to run at idle speed. When the closed throttle condition is present, the inlet manifold sub-atmospheric pressure is maximum. While the vehicle is decelerating, the governor pressure in line 33 decreases, due to the action of the governor 30 thereby allowing the shift valve 22 to close. When the shift valve 22 closes, the fluid under pressure in lines 34 and 35 is exhausted allowing the clutch 36 to disengage, under the action of a return spring, and the low servo to be energized. This establishes the low gear ratio of the planetary gear set 32. The rate of deceleration will change during the shift interval. The amount of change will depend on the force which the low servo applies to the reaction member in the gear set. The force available is a function of the pressure in line 27, which is system pressure, as determined by the pressure regulator valve 23. The system pressure is reduced, during a closed throttle downshift due to the effect the modulator pressure in line 20 has on the pressure regulator valve 23. The vacuum booster 38 causes a decrease in the modulator pressure at closed throttle thereby decreasing the system pressure to a level below that attainable without the use of a vacuum booster.

FIGURE 2 is a modification of the vacuum booster having an adjustable restriction member 51. The restriction member 51 is a strip of material, such as nylon, having various size restricted passages 52, 53, and 54. The member 51 is slidable in a slot 56 which is adjacent to the abutment surface 42 in the vacuum booster 38. The member 51 is held in the slot 56 in a position relative to the large diameter portion 43 and the small diameter portion 44 by the abutment surface 42 and a locating screw 55. With this modification it is possible to change the pressure level in the reduced pressure region A by loosening the locating screw 55 and repositioning the member 51 so that a restricted passage of a different size is positioned between portions 43 and 44. When a restricted passage of the proper size is positioned the locating screw 55 can be tightened to hold the member 51 in its proper position. Thus the vacuum booster does not have to be removed from the fluid circuit in the event a change in restricted passage size is necessary.

The vacuum booster 38' shown in FIGURE 3 has a through passage 40' having equal diameter upstream portion 43' and downstream portion 44' separated by a restricted portion 47' and a passage 41 which intersects through passage 40 at point 45'. The restricted portion 47' is formed by an abutment 42' on one end of portion 43' and a conical shaped portion 48 communicating upstream portion 43' with downstream portion 44'. A fluid flow from upstream portion 43' to downstream portion 44' creates a reduced pressure region similar to that discussed for vacuum booster 38 above.

As may be seen from the foregoing description, it is a simple matter to replace one vacuum booster or the restriction therein with another to control the degree of increase or boost of vacuum which with this throttle control changes the closed throttle downshift characteristic of a transmission without the time consuming disassembly of the transmission control.

It will be appreciated that the vacuum could be reduced in a converse of this system particularly where the modulator pressure varied directly with manifold vacuum or the engine manifold vacuum was used at closed throttle. When the carburetor throttle valve is used as the valve means to selectively connect the booster to atmosphere or vacuum the air passes through the air cleaner before entering the system and is thus clean but a separate three-way valve could be used to selectively connect line 58 directly to atmosphere or to engine manifold. The throttle control boosts vacuum at closed throttle in the preferred embodiment but could do this in a range of low throttle positions or in a converse arrangement in a range of high throttle positions.

These and other modifications of the invention may be made within the scope of the appended claims.

What is claimed is:

1. In a transmission, drive means having fluid operated friction drive means, drive control means for selectively supplying fluid under pressure to and exhausting said fluid operated friction drive means to establish said drive means, single vacuum supply means providing a supply of engine manifold vacuum, vacuum control means connected to said single vacuum supply means and responsive thereto for providing a transmission control vacuum having a controlled higher degree of vacuum related to the degree of vacuum supplied by said single vacuum supply means, and modulating means having a vacuum motor connected to said vacuum control means for actuation by said transmission control vacuum and connected to said drive control means for supplying said drive control means with a modulated force varying with said transmission control vacuum.

2. The invention defined in claim 1 and said vacuum control means having a variable restriction to provide different degrees of change of vacuum from said supply means vacuum to said transmission control vacuum.

3. The invention defined in claim 1 and engine throttle control means having a plurality of positions connected to said vacuum control means for changing the relation of the degree of transmission control vacuum to the degree of vacuum of the supply means in accordance with throttle control position.

4. The invention defined in claim 1 and said drive means having a gear unit and low and high fluid operated friction drive establishing means and said drive control means selectively supplying and exhausting said fluid operated friction drive establishing means to selectively establish low and high drives and said modulating means being a pressure modulating valve supplying said drive control means with a modulated pressure varying with said transmission control vacuum.

5. The invention defined in claim 4 and said vacuum control means including a restricted passage having a restriction therein and connected at one end to atmosphere and at the other end to said supply means and a transmission control vacuum passage connected to said restricted passage just downstream of said restriction to provide a boosted transmission control vacuum, said pressure modulator valve means providing a modulator pressure varying inversely with transmission control vacuum, engine throttle control means movable from closed to full open throttle positions and valve means operating in response to said throttle control means in partial and full throttle positions to close said one end of said restricted passage normally open to atmosphere and connect it to said supply means, said vacuum means being operative in response to the connection of said supply means to both ends of said restricted passage to provide a transmission control vacuum equal to supply vacuum for normal modulator pressure, said valve means operating in response to said throttle means in said closed throttle position to connect said one end to atmosphere to boost transmission control vacuum and reduce modulator pressure for closed throttle downshifts.

6. In a transmission, drive means having fluid operated friction drive means, drive control means for selectively supplying fluid under pressure to and exhausting fluid from said fluid operated friction drive means to selectively establish said drive means, single vacuum supply means providing a supply of engine manifold vacuum, throttle control means having a plurality of throttle control positions, vacuum control means connected to said single vacuum supply means and to said throttle control means and operative in response to said manifold vacuum and the position of said throttle control means to provide a transmission control vacuum having a value equal to or higher than said single vacuum supply means and changing both as a function of engine manifold vacuum and throttle position and modulating means having a vacuum motor connected to said vacuum control means for actuation by said transmission control vacuum and connected to said drive control means for supplying said drive control means with a modulated force varying with said transmission control vacuum.

7. In a control for a transmission for use with a driving engine having a manifold with subatmospheric pressure therein, said control comprising means responsive to a vacuum motor, vacuum control means having a first passage open on both ends, a second passage open on one end, restriction means between the open ends of said first passage, said second passage intersecting said first passage in a region of flow changed pressure adjacent said restriction means to provide a subatmospheric control pressure, said second passage being adapted for connection to said vacuum motor, said first passage being adapted for connection at the open end of said first passage downstream of said restriction means to said manifold, said first passage being subjected to atmospheric pressure at the open end of said first passage upstream of said restriction means to provide a subatmospheric control pressure different from the subatmospheric pressure in the manifold for operation of said vacuum motor.

8. The invention defined in claim 7 and said second passage intersecting said first passage on the downstream side of said restriction means to provide subatmospheric pressure greater than the subatmospheric pressure in the manifold.

9. The invention defined in claim 7 and said restriction means being adjustable to vary the relationship of said control pressure to said manifold pressure.

10. The invention defined in claim 7 and further including means for subjecting said first passage upstream of said restriction means to atmospheric pressure during one operating condition and subjecting said first passage upstream of said restriction means to a pressure equal to said subatmospheric pressure in said manifold during another operating condition.

11. The invention defined in claim 7 and throttle control means having a plurality of positions operatively connected to said vacuum control means to further vary said subatmospheric control pressure with the position of said throttle control means.

12. The invention defined in claim 7 and said means comprising a carburetor having a manually operable throttle valve, and a passage spaced relative to said throttle valve so that the passage will be subjected to atmospheric pressure when the throttle valve is closed and subjected to a subatmospheric pressure equal to the subatmospheric pressure in the manifold when the throttle valve is opened, and a conduit connecting said passage with said first passage upstream of said restriction means.

13. A control for an automatic transmission for use as the driving engine having a manifold with subatmospheric pressure therein, vacuum motor means for controlling a transmission, single vacuum supply means providing a single source of engine manifold vacuum, vacuum control means connected between said single vacuum supply means and said vacuum motor means and providing a transmission control vacuum having a different degree of vacuum related to said degree of vacuum of said single vacuum supply means to said vacuum motor means.

14. The invention defined in claim 13 and said vacuum control means being adjustable to vary the relationship between engine manifold vacuum and said transmission control vacuum.

15. The invention defined in claim 13 and throttle control means having a plurality of positions connected to said vacuum control means for changing the relationship between the degree of said transmission control vacuum and the degree of said supply vacuum with the position of said throttle control means.

References Cited

UNITED STATES PATENTS

| 2,753,732 | 7/1956 | Harrison | 74—864 |
| 2,837,932 | 6/1958 | Roller | 74—863 |
| 3,077,122 | 2/1963 | Olsen | 74—869 X |

ARTHUR T. McKEON, *Primary Examiner*

U.S. Cl. X.R.

74—865